United States Patent [19]

Brandenburg et al.

[11] 4,438,219
[45] Mar. 20, 1984

[54] ALUMINA CATALYST STABLE AT HIGH TEMPERATURES

[75] Inventors: John T. Brandenburg, Port Neches, Tex.; John M. Crone, Jr., Fishkill, N.Y.

[73] Assignee: Texaco Inc., White Plains, N.Y.

[21] Appl. No.: 315,824

[22] Filed: Oct. 28, 1981

[51] Int. Cl.$^3$ .................... B01J 21/02; B01J 21/04; B01J 21/12; B01J 23/10

[52] U.S. Cl. .................... 502/333; 502/202; 502/263; 502/302; 502/323; 502/332; 502/334; 502/341; 502/344; 502/349; 502/354; 502/355; 423/213.5

[58] Field of Search ............. 252/463, 455 R, 462, 252/466 PT, 432, 464, 465, 466 J; 423/213.5

[56] References Cited

U.S. PATENT DOCUMENTS

| | | | |
|---|---|---|---|
| 3,172,866 | 3/1965 | Belon | 252/432 X |
| 3,231,520 | 1/1966 | Leak et al. | 252/463 |
| 3,291,564 | 12/1966 | Kearby | 252/476 X |
| 3,819,536 | 6/1974 | Dalla Betta et al. | 252/462 |
| 4,140,655 | 2/1979 | Chabot et al. | 423/213.5 X |

*Primary Examiner*—W. J. Shine

*Attorney, Agent, or Firm*—Carl G. Ries; Robert A. Kulason; Martin M. Glazer

[57] ABSTRACT

An alumina catalyst, which has a desired porosity and surface area and is stable at high temperatures is formed by contacting a substrate with an alkali aluminate solution for a period of time sufficient to form an adherent film of hydrated alumina on the substrate, separating the substrate with the adherent film of hydrated alumina from the solution, heating the substrate and alumina film under calcining conditions until an alumina film of desired porosity and surface area is formed, and then contacting the calcined alumina film with a material which stabilizes the alumina during subsequent heating. Optionally, the alumina film can then be further calcined at a temperature higher than that used in the first calcining conditions, preferably at a temperature up to about 1260° C. The stabilizing material can be one of several compounds including those of barium, silcon, and the rare earth metals. Further, dissolving the stabilizing material and a catalytic metal, such as platinum, into a solvent, and contacting this solution with the calcined alumina film produces a substantially even distribution of the catalytic metal on the calcined alumina film.

22 Claims, No Drawings

ALUMINA CATALYST STABLE AT HIGH TEMPERATURES

BACKGROUND OF THE INVENTION

1. Field of the Invention

This invention relates to catalysts and more particularly to alumina coated substrates, stable at high temperatures, and to methods of making the same.

2. Description of the Prior Art

Catalysts which are used to treat large volumes of gases having high space velocities, such as exhaust gases from internal combustion engines, preferably have large pores, good heat and mass transfer characteristics, low resistance to fluid flow, and low thermal mass. One example wherein such catalysts are useful is in the treatment of internal combustion engine exhaust gases, which are generally treated in order to reduce or eliminate certain constituents, such as carbon monoxide, oxides of nitrogen, hydrocarbons, lead halides and particulate matter, such as lead and carbon particles.

Alumina, coated and adhered to an extended substrate, then calcined and having added catalytic metal, if required, has been found to be a useful and effective catalyst for treating internal combustion engine exhaust gases. A thin layer of calcined alumina adhered to the surface of an extended substrate, such as a metal mesh, and used as a catalyst, has several advantages over other available structures, such as alumina coated ceramic monoliths or pelletized alumina. The packing density of alumina coated substrates can be very low and yet have a relatively large external alumina surface contacting the gas. Also, the low resistance to flow, the high rates of heat and mass transfer, and the low thermal mass of alumina coated substrates, favor the use of these structures, especially when the flowing gas is to be used to control the reaction temperature of the catalytic reaction on the alumina, or wherein particulate matter is to be filtered out by the porous alumina from the flowing gas.

Coassigned U.S. Pat. No. 3,231,520 discloses a preferred method of forming an adherent alumina film on a substrate. The alumina film can be used as a support for catalytic materials which are used to promote a variety of reactions including those useful in treating exhaust gases from internal combustion engines. The substrate on which the alumina film is formed can be a metal or nonmetal, and can have a variety of configurations. The adherent alumina film is disclosed as being formed by contacting the substrate with a sodium aluminate coating solution causing a hydrated adherent film of alumina trihydrate to be formed on the substrate. When the adherent alumina trihydrate film is dried and calcined, a hard film of porous alumina, sufficiently tenacious to withstand ordinary usage, forms on the substrate. Coassigned U.S. Pat. Nos. 3,227,659 and 3,410,651, disclose the impregnation of an alumina film, formed in a manner similar to that of U.S. Pat. No. 3,231,520, with phosphorus and chromium containing materials, respectively.

The alumina coated substrate is disclosed as being used without impregnation as a filter to remove lead compounds from internal combustion engine exhaust gases in coassigned British Pat. No. 1,271,710, and as a filter to remove carbon particles from diesel engine exhaust gases in coassigned U.S. Pat. No. 4,039,294.

Using the porous alumina coated substrate, (with or without added catalytic materials) to treat the exhaust gases of an internal combustion engine under normal operating conditions does not generally subject the alumina film and substrate to temperatures in excess of the calcining temperature initially used to form the porous alumina film. Under these normal conditions the alumina film remains intact and continues to perform satisfactorily. However, under certain abnormal operating conditions of an internal combustion engine, or because of the ignition of certain combustible materials which have built up on a limited portion of the alumina film, much higher temperatures (upwards of 1260° C.) can be reached by portions of the alumina film. At such high temperatures, the surface area of the alumina film rapidly diminishes, dropping well below 10 square meters per gram of alumina, and further, the structural integrity of the alumina film rapidly degrades causing powdering and other structural failures. Both the decrease in surface area and the physical loss of alumina material results in a diminished surface area of alumina film and catalyst material available to treat the exhaust gases.

Previously, it has been disclosed that certain materials appear to stabilize calcined alumina at high temperatures, reducing the loss of surface area, and of structural integrity that would otherwise occur. U.S. Pat. No. 3,899,444 discloses several materials useful for this purpose including potassium, cesium, and barium compounds, and also rare earth metal oxides. U.S. Pat. No. 3,291,564 discloses some of these same materials. U.S. Pat. No. 3,172,866 discloses the use of boron oxide as a stabilizing material. A paper by James Roth et al. entitled "Control of Automotive Emmissions by Particulate Catalyst" published by Society of Automotive Engineers and presented at the International Autumotive Engineering Conference in Detroit, Mich. on Jan. 8–12, 1973, (paper No. 730,277) discloses several materials believed to stabilize calcined alumina at high temperatures resulting in a higher surface area than could be otherwise expected to occur. Also, certain materials are disclosed, which when added to the calcined alumina, produce an alumina with a smaller surface area at a lower temperature than untreated alumina.

In the prior art, the stabilizing material, when used, generally was just added to a slurry or mixture of calcined and powdered alumina, and a carrier. The mixture of stabilizing material, calcined alumina and carrier were then applied to a support or formed into a desired shape.

Attempting to incorporate stabilizing materials into the alumina film formed, for instance, by the method of U.S. Pat. No. 3,231,520, by the simple addition of the stabilizing materials to the basic sodium aluminate solution prior to or during contacting of the solution with a substrate, generally results in undesirable reactions between the stabilizing materials and the constituents of the sodium aluminate solution. The reactions can cause the precipitation of the stabilizing materials, preventing their inclusion in the alumina film. The addition of the stabilizing materials to the formed alumina trihydrate film prior to dehydration, results in the stabilizing materials being found only on the surface of the hydrated alumina film. When the alumina film is subsequently dehydrated, the stabilizing materials remain on the surface of the calcined alumina film, resulting in a lack of stabilization of a major portion of the calcined alumina film.

SUMMARY OF THE INVENTION

It now has been discovered that the reduction in surface area, and the loss of structural integrity of a calcined alumina film, coated onto and adhered to a substrate by a method such as disclosed in coassigned U.S. Pat. Nos. 3,227,659, 3,231,520, and 3,240,698, caused by high temperatures, can be ameliorated by heating the substrate and the hydrated adherent alumina film under calcining conditions preferably at a temperature between about 300° C. and 800° C., to form a dehydrated adherent alumina film having a desired porosity and surface area, and then contacting the alumina film with a material which stabilizes the adherent alumina film during subsequent heating. Optionally, the substrate and calcined adherent alumina film having the stabilizing material can then again be heated under second calcining conditions comprising a temperature higher than that used in the first calcining conditions. The second temperature is preferably one up to about 1260° C. The surface area and porosity of the stabilized alumina film do not substantially change thereafter with subsequent heatings at a temperature up to the second calcining temperature. For example the combination of the stabilizing material and subsequent calcining at a temperature up to about 1260°, prevents a loss of surface area and structural integrity of the alumina film, when subjected to excessively hot exhaust gases, such as caused by a malfunction in the internal combustion engine, and also, prevents damage caused by the ignition or the exothermic reaction of a localized concentration of combustible material by a catalytic material, all of which can reach up to the second calcining temperature.

Even though the stabilized alumina coated substrates can be calcined at a temperature up to about 1260° C. prior to use, the omission of the second calcining step results in a considerable saving of energy that would ordinarily be used to calcine the alumina film for the second time. The heat to which the alumina film is subjected during use, such as the heat generated by the malfunctioning of an internal combustion engine or the heat generated by local abnormal reaction or ignition conditions, acts to calcine the alumina to substantially the same degree as would a second high temperature calcining step during manufacture. The presence of the stabilizing material, which is successfully added by the process of the present invention to the adherent alumina film, produces a catalyst or catalyst support which is capable of being subjected to a temperature up to about 1260° C. or higher, without a detrimental loss of surface area or a detrimental degredation of structural integrity.

It has also been found that when a catalytic material, such as platinum, and the stabilizing material are combined in a single solution, and added together to the calcined alumina film, there is a substantially even distribution of the catalytic material throughout the alumina film. Without the presence of the stabilizing material in the solution, the simple addition of a solution containing a soluble catalytic material to the calcined alumina film results in the preferential deposition of the catalyst material on the portion of the alumina film which first comes into contact with the solution.

PREFERRED EMBODIMENT OF THE INVENTION

In the preferred embodiment of the present invention a catalytic article is prepared by contacting a substrate with an aqueous solution of an alkali aluminate for a period of time sufficient to form an adherent alumina trihydrate film on the substrate, separating the substrate from the solution, heating the alumina film and substrate under calcining conditions until the alumina film develops a desired porosity and surface area, and then contacting the calcined alumina film with a material which stabilizes the calcined alumina film during subsequent heating. Optionally, a catalytic material, such as one of the platinum group metals, can be added to the calcined alumina film simultaneously with, or subsequently to the addition of the stabilizing material. Further, the calcined alumina film after the addition of the stabilizing material, can be heated under second calcining conditions at a desired temperature, generally one much higher than the first calcining temperature, preferably up to about 1260° C. The second calcining conditions preferaby comprise a temperature in the range of about 800° C. to 1260° C. A temperature between about 870° C. and 1200° C. or between about 870° C. and 1090° C. can also be used.

The calcined alumina film covered substrate can be used as desired, such as a particle filter, as a support for a catalytic metal, or as a gas absorber. The calcined alumina film covered substrate can be used to remove lead or carbon particles from the exhaust gas of a gasoline or diesel engine by contacting the particle containing gas with the calcined alumina film. The calcined alumina film covered substrate also can be used as a gas absorber, for example by absorbing a gas from a gas stream of an internal combustion engine into the pores of the stabilized calcined alumina. The absorbed gas can be catalytically reacted therein, and be subsequently deabsorbed. Such a gas absorbing process can be accomplished by contacting the alumina coating with the exhaust gas stream from the internal combustion engine.

In use, if the temperature of the alumina film exceeds the final calcining temperature, there is substantially no effect on the alumina film. The presence of the stabilizing material acts to prevent a significant degradation in the surface area and porosity of the calcined alumina film when it is exposed to a temperature up to the final calcining temperature.

The step, after the contacting of the stabilizing material, of heating the alumina film and substrate under second calcining conditions which comprise a temperature higher than the temperature of the first calcining conditions, can be omitted in order to save energy. The loss of surface area of the alumina caused by the alumina film being heated in use above the temperature of the first calcining conditions is reduced by the stabilizing material, and there is substantially no loss in surface area during subsequent heatings to the same temperature. Ultimately, the alumina film is calcined at the highest temperature that it is subjected to in use, and no substantial reductions in surface area then occur, unless the previously reached highest temperature is exceeded. However, when the stabilized alumina film is subjected to a second calcining step after the addition of the stabilizing material and before being placed in service, an alumina film of given porosity and surface area is formed whose porosity and surface area does not substantially change unless the second calcining temperature is exceeded during use.

The process of forming the alkali aluminate solution and the process of forming an adherent alumina trihydrate film on a substrate is disclosed in several coassigned U.S. patents including U.S. Pat. Nos. 3,227,659;

3,231,520; and 3,240,698, all of which are incorporated herein by refferrence. The exact mechanism by which the alumina film forms on the substrate is not precisely known, however, it is known that the deposited film is chiefly a trihydrate phase of the alumina.

Briefly, the alkali aluminate solution, useful in the present invention, can be prepared by dissolving metallic aluminum in a strong aqueous solution of an alkali hydroxide. Alternatively, alumina can be dissolved in an aqueous solution of an alkali hydroxide or commercially prepared alkali aluminate can be dissolved in water.

The alkali portion of the alkali aluminate is preferably sodium; however, the other alkali metals which include potassium, lithium, rubidium, or cesium can also be used. Further, other cations similar in properties to alkali metal cations can also be used to form the aluminate salt, as quaternary bases such as tetramethyl ammonium hydroxide.

The concentration of the alkali aluminate solution is preferably not less than 0.5 molar, and is preferably in the range of from about 1 to 5 molar. Such a concentration is desirable so that a serviceable film of alumina can be deposited within a reasonable amount of time, preferably from about one to twenty hours. Preferably, metallic aluminum is maintained in contact with the solution during deposition, to replenish the sodium aluminate as it deposits onto the surface of the substrate. Depending on the concentration of sodium hydroxide present, the concentration of the sodium aluminate in the solution, can vary from about 0.1 molar to about 10 molar.

Preferably, the solution is at a temperature above normal room temperature. It is desirable to have the solution at a temperature of at least 50° C. and preferably from about 80° to 100° C. Even though a higher temperature can be used, the temperature of the solution determines the phase of the hydrated alumina formed on the substrate. The preferred alpha alumina trihydrate forms at temperatures above about 50° C. and thus the deposition is generally preferred to occur at, or more preferably above this temperature.

Generally, the film of alumina formed should be substantially uniform, and should not be substantially less than about $2 \times 10^{-3}$ centimeter thick, and preferably not less than about $1 \times 10^{-2}$ centimeter thick. Deposits of alumina of almost any thickness are possible, but coatings generally thicker than about $5 \times 10^{-1}$ centimeter are generally not useful. Preferred films are from about $1 \times 10^{-2}$ centimeter to $8 \times 10^{-2}$ centimeter.

The substrate can be formed of a metal or a nonmetal and can include such materials as stainless steel, steel, nickel, iron, iron alloys, chrome-nickel alloys, titanium, sintered metal materials, refractory or ceramic materials for example high melting point glass, metal oxides e.g., magnesia and silica, or refractory metal silicates or carbides. The substrate is not restricted to any particular configuration and can have useful configurations such as bars, balls, chains, mesh, plates, saddles, sheets, tubes, wire, ribbons, chopped wire, wire mesh or the like. When the substrate is in a filament form, and is enclosed in a casing or tube, prior to the deposition of the alumina film on the substrate, the adherent film of alumina forms on both the filaments and on the internal surface of the casing or tube, and bonds the filaments to the interior wall of the casing or tube forming an encased catalyst. This is disclosed in coassigned U.S. Pat. No. 3,362,783.

After the alumina trihydrate film has been deposited to a suitable thickness on the substrate as an adherent film, the alumina film and substrate are subjected to heating, to drive off at least a part of the water of hydration. The calcination of the alumina trihydrate film results in a calcined alumina film having a porosity and a measurable surface area. The size of the pores depends upon the calcination conditions which include temperature, humidity, and the pressure of the atmosphere surrounding the alumina during calcination. A calcination temperature of from about 300° to about 800° C. is preferred. Temperatures within this range produce an alumina film having a sufficiently high porosity to successfully treat a fluid flow including the exhaust gases of internal combustion engines. Too high a porosity produces an alumina having a small surface area per gram which requires the use of a large quantity of catalyst to successfully treat the fluid flow. On the other hand, too low a porosity and too high a surface area results in the fluid being treated only by diffusion, restricting the quantity of fluid that can be treated by a given quantity of catalyst, and forcing most of a high volume fluid flow around the catalyst.

In treating the large volumes of gas produced by internal combustion engines, it is preferred to have a catalyst of high porosity. A high porosity catalyst can be formed by calcining the deposited alumina trihydrate film at a temperature between about 300° C. and 800° C., but more preferably at a temperature of between about 450° C. and 650° C. which produces a dehydrated alumina film having a surface area of from about 140 to 180 square meters per gram. Heating the alumina film to a higher temperature produces a correspondingly smaller surface area and a correspondingly higher porosity.

Once the desired porosity is achieved, the stabilizing material is contacted with the alumina film. The stabilizing material can be one or more of the known stabilizing materials such as the compounds of barium, silicon, rare earth metals, alkali and alkaline earth metals, boron, thorium, hafnium, and zirconium. Of the stabilizing materials barium oxide, silicon dioxide, and the rare earth oxides (either alone or in mixtures) which include lanthanum, cerium, praseodymium, neodymium, promethium, samarium, europium, gadolinium, terbium, dysprosium, holmium, erbium, thulium, ytterbium, and lutetium are presently preferred since contacting them with a calcined alumina film permits the calcined alumina film to retain a higher surface area at higher temperatures than many other stabilizing materials are able to achieve.

The stabilizing material is preferably contacted with the calcined alumina film by dissolving the stabilizing material in an appropriate solvent and contacting this solution with the calcined alumina film. For example, barium can be used as barium acetate dissolved in water, lanthanum can be used as an aqueous solution of lanthanum nitrate ($La(NO_3)_3$) and the other rare earths can similarly be used as nitrates dissolved in water. Silica can be contacted with the alumina film as an isopropanol silica sol prepared by dissolving ethyl silicate in isopropanol and adjusting the acidity to approximately 0.1 N with nitric acid ($HNO_3$) or as a colloidal silica suspension, such as one sold under the trademark "Nalco 141001" by Nalco Chemical Co., Oak Brook, Ill.

The stabilized calcined alumina film preferably contains from about 0.1 to 10 mole percent of oxidized stabilizing material with from about 0.4 to 6 mole percent being most preferred. The volumes of the solution containing the stabilizing material used with the calcined alumina film, preferably, should be about equivalent to, or slightly greater than the pore volume of the alumina film, so that the alumina film is just completely wetted by the added solution. Alternately, the alumina can be immersed in an excess volume of a solution containing the stabilizing material, and allowed to remain in contact with the solution until a desired quantity of stabilizing material has been exchanged into the alumina. Even though aqueous solutions are disclosed as being useful for contacting the stabilizing material with the calcined alumina film, nonaqueous solutions can also be employed. Nonaqueous solvents are useful with stabilizing materials which are not water soluble. For instance, zirconium can be used as a methyl alcohol solution of zirconyl nitrate.

After the stabilizing material has been contacted with the calcined alumina film, the moistened calcined alumina film can be dried. After drying, the stabilizing material is in substantially intimate contact with the calcined alumina film. The drying can occur at any temperature which can evaporate the solvent used. Drying can be carried out in the presence of air at a sufficiently high temperature so as to oxidize the stabilizing material and change it into the oxide form. Drying can also be combined with a second calcining of the calcined alumina film. In one embodiment of the present invention, wherein barium acetate is used as the stabilizing material, the calcined alumina film after being wetted by the stabilizing material is dried at a temperature above about 100° C. to effect the removal of water used to dissolve the stabilizing material, and then the calcined alumina film and stabilizing material are heated to a temperature of about 1200° C.

When the calcined alumina film is used as a support for a catalytic metal, which is deposited thereon in a soluble form, the dissolved catalytic metal is preferably combined with the stabilizing material and both are substantially simultaneously contacted with the calcined alumina film. It has been found that the use of the stabilizing material, along with the soluble catalytic material produces a substantially uniform distribution of the catalytic material throughout the calcined alumina film. Previously, it has been found that the application of a catalytic material in a soluble form to the calcined alumina film resulted in the preferential absorption of the catalytic material on the portions of the calcined alumina film which first came into contact with the solution as it was contacted with the calcined alumina film. This resulted in the concentration of catalytic material within certain small portions of the calcined alumina film. Such areas of concentrated catalyst resulted in an above average level of reaction occuring in those small areas, which in turn produced a buildup of heat and high temperatures. Further, catalytic materials concentrated in small areas of the calcined alumina film produce an inefficient application of the generally expensive catalytic materials, and result in the use of larger quantities of expensive catalytic materials than would otherwise be necessary.

Useful catalytic materials are metals and their compounds found in groups IB, IIB, IVB, VB, VIB, VIIB and VIII of the Periodic Table of Elements. Particularly useful catalytic materials include platinum, palladium, iridium, and rhodium. The preferred catalytic metals can be used as the chlorometallic acid, such as chloroplatinic acid or as one of the many soluble metallic complexes well known in the art.

The invention will be better understood from the following examples which further illustrate, but are not meant to limit the invention in any way.

EXAMPLE 1

A sodium aluminate solution is prepared by dissolving 293 grams of sodium hydroxide in 5 liters of water and adding thereto 192 grams of aluminum metal in the form of small pellets or granules. Several hollow cylinders, 5.1 centimeters in length and 2.5 centimeters in diameter, are formed from a stainless steel having a composition, by weight, of 78 percent iron, 18 percent chromium, 2 percent aluminum, 1 percent silcon, and 0.5 percent nickel, this stainless steel is sold under the trademark Armco 18 SR. The stainless steel cylinders are packed with about 3 grams of a knitted wire mesh formed from a stainless steel wire having a 0.32 millimeter diameter and having a composition by weight of 72 percent iron, 22 percent chromium, 4.5 percent aluminum, and 0.5 percent cobalt, this stainless steel is sold under the trademark Kanthal D.

The packed cylinders are immersed in the sodium aluminate solution which is maintained at a temperature of about 82° C. The packed cylinders remain in the sodium aluminate solution for several hours until a hydrated alumina coating is formed on the stainless steel cylinders and on the knitted wire mesh packed within the cylinders. The coated packed cylinders are removed from the coating solution, washed thoroughly with tap water and then with distilled water. The coated packed cylinders are dried and the alumina film is gradually calcined, to avoid cracking, by heating the coated packed cylinders in air, first at about 150° C. for about one hour, then at about 260° C. for about one hour, and finally at about 540° C. for about two hours. After calcining, the alumina film is found to have a surface area of about 150 square meters per gram of alumina.

One of the calcined coated packed cylinders is reheated in air at about 1200° C. for about two hours. The surface area of the alumina coating is found to be about 7.4 square meters per gram of alumina which is significantly smaller than the surface area before heating to about 1200° C.

EXAMPLE 2

A packed cylinder is coated and calcined to about 540° C. as in Example 1. The packing material of knitted wire mesh weighs 3.30 grams and has a calcined alumina coating thereon of 2.17 grams. The calcined alumina coating is wetted with an aqueous solution comprising barium acetate ($Ba(C_2H_3O_2)_2$) and chloroplatinic acid ($H_2PtCl_6$). A sufficient volume of solution is used to just wet all of the alumina coating, the volume of solution necessary for this is about 1 cubic centimeter. The packed cylinder is then dried and heated in air at about 1200° C. for about two hours. The solution contains sufficient dissolved barium acetate and dissolved platinum in the form of chloroplatinic acid to produce about 0.065 gram of barium oxide (BaO) and 0.011 gram of platinum on the alumina coating after subsequent calcining in air of the packed cylinder at about 1200° C. The barium oxide comprises about two mole percent by weight of the total weight of barium oxide and alumina on the surface of the knitted wire mesh. The surface area of the alumina coating, after calcining at about 1200° C., is found to be 24.5 square meters per gram of alumina. This surface area is considerably larger than the surface area of 7.4 square meters per gram that is set forth in Example 1 as occurring after calcining at about 1200° C. without the use of any stabizing material.

EXAMPLE 3

A packed cylinder is coated and calcined to about 540° C. as in Example 1. The cylinder contains 3.90 grams of knitted wire mesh and after calcining at 540° C. has 2.56 grams of alumina coated thereon. The calcined alumina coating is wetted with about 1 cubic centimeter of solution which comprises barium acetate and chlorplatinic acid dissolved in water and is a sufficient volume of liquid to wet the entire alumina film. The packed cylinder is then dried and heated in air at about 1200° C. for about two hours. The solution added to the alumina contains sufficient barium acetate and chloroplatinic acid to produce 0.038 gram of barium oxide and 0.013 gram of metallic platinum on the alumina after subsequent heating in air at about 1200° C. The barium oxide comprises about 1 mole percent by weight of the total weight of barium oxide and alumina on the knitted wire mesh surface. After the second calcining step, the surface area of the alumina is found to be about 19.0 square meters per gram of alumina. This surface area is considerably larger than the surface area of 7.4 square meters per gram that is set forth in Example 1 as occuring after the second calcining without the use of any stabilizing material, but is smaller than the surface area achieved using twice as much barium oxide.

EXAMPLE 4

A packed cylinder is coated and calcined to about 540° C. as in Example 1. The cylinder contains 2.56 grams of knitted wire mesh and has a calcined alumina coating thereon of 1.68 grams. The calcined alumina coating is wetted with about 1 cubic centimeter of an aqueous solution which comprises rare earth nitrates and chloroplatinic acid. The about 1 cubic centimeter of solution is sufficient to just wet the entire alumina coating. The packed cylinder is then heated in air at about 1200° C. for about two hours. The solution contains sufficient rare earth nitrates and chloroplatinic acid to produce 0.054 gram of rare earth oxides and 0.0084 gram of metallic platinum on the alumina after subsequent heating in air at about 1200° C. The rare earth oxides comprise about 1 mole percent by weight of the alumina coating on the wire mesh. After the second calcining step the alumina is found to have a surface area of about 24.0 square meters per gram of alumina. This is considerably larger than the alumina surface area of 7.4 square meters per gram that is set forth in Example 1 as occurring after the second calcining step without the use of any stabilizing material.

EXAMPLE 5

A packed cylinder is coated and calcined to about 540° as in Example 1. The cylinder contains 4.09 grams of knitted wire mesh and has a coating of alumina which after calcining at about 540° C. weighs 2.68 grams. The calcined alumina coating is wetted with about 1 cubic centimeter of an aqueous solution which comprises rare earth nitrates and chlorplatinic acid. The about 1 cubic centimeter of solution is sufficient to just wet the entire alumina coating. The packed clyinder is dried and then calcined in air at about 1200° C. for about two hours. The solution contains sufficient rare earth nitrates and chloroplatinic acid to produce 0.043 gram of rare earth oxides and 0.013 gram of metallic platinum on the alumina after subsequent heating in air at about 1200° C. The rare earth oxides comprise about 0.5 mole percent by weight of the alumina coated on the wire mesh. After the second calcining step, the alumina is found to have a surface are of about 19.9 square meters per gram of alumina. This is considerably larger than the alumina surface area of 7.4 square meters per gram set forth in Example 1 as occurring after the second calcining without the use of any stabilizing material, but is smaller than the surface area achieved using twice as much rare earth oxides.

EXAMPLE 6

A packed cylinder is coated and calcined to about 540° C. as in Example 1. After calcining, the cylinder contains about 3.34 grams of alumina coated on the knitted wire mesh. The alumina coating is wetted with about 1 cubic centimeter of a solution which is formed by dissolving ethyl silicate $((CH_3CH_2)_2SiO_3)$ in isopropyl alcohol $(CH_3CH(OH)CH_3)$ and acidifying the solution with 1% nitric acid $(HNO_3)$ to about 0.04 N. The about 1 cubic centimeter of solution is sufficient to just wet the entire alumina coating. The packed cylinder is dried and calcined in air at about 1200° C. for about two hours. A sufficient quanity of silicon is present in the solution to produce 0.17 gram of silica $(SiO_2)$ on the alunina after subsequent drying and heating in air at about 1200° C. The silica represents about 5 weight percent of the alumina coating. After the second calcining, the surface area of the alumina is found to be about 19.9 square meters per gram. This is considerably larger than the alumina surface area of 7.4 square meters per gram set forth in Example 1 as occurring after the second calcining without the use of any stabilizing materials. Further, it is found that the alumina coat is hardened by the presence of the silica more than by any of the other additives. The hardened alumina coating is preferable in some applications.

EXAMPLES 7 THROUGH 15

Examples 7 through 15 are summarized in Table 1. In each example a knitted wire mesh, packed cylinder is coated and calcined as in Example 1 except that the last calcining temperature is about 480° C. for two hours as opposed to the about 540° C. for two hours set forth in Example 1.

In Example 7, three calcined packed cylinders are wetted with a sufficient quantity of distilled water to just wet the alumina coating, this volume is about 1 cubic centimer. After drying, one cylinder is calcined in air at about 870° C. for about 4 hours, a second cylinder is similarly calcined at about 980° C., and a third is similarily calcined at about 1090° C. The surface area of the alumina coating calcined at each temperature is set out in Table 1.

In Examples 8 through 15, a stablizing material, which is either in the soluble carbonate, acetate or nitrate form, is dissolved in a volume of water which is just sufficient to wet the alumina coating of the packed cylinder. For the cylinders used in Examples 1 through 18, the volume of solution is about 1 cubic centimeter. The stabilizing material, when subsequently heated in air for about 4 hours at the temperatures indicated, is oxidized to the oxide form. Sufficient stabilizing material is used in the solution added to the packed cylinder so that the oxide represents a certain mole percent by weight of the total weight of the alumina and stabilizing material present. The mole percent of the oxide present is indicated on Table 1 and varies from about 2 percent to about 4 percent by weight. The surface area of the alumina after being calcined for about 4 hours in air, at the three temperatures indicated, is tabulated in Table 1.

It is apparent from Table 1, that the addition of the stabilizing materials listed produce an increase in the surface area of the alumina coating at each calcining temperature as compared to the surface area of the alumina calcined without the addition of the stabilizing materials. Further, from Table 1 it is apparent that the barium oxide and the lanthanum oxide show a superior ability to prevent the loss of surface area of the alumina, even at the higher temperature of about 1090° C.

From the results of Examples 2 through 6, and Examples 7 through 15 (which are tabulated in Table 1) it is apparent that calcining the alumina film at a temperature of either 480° C. or 540° C. and then adding the stabilizing material produces an alumina film having a useful surface area, even when it is further heated at a temperature up to about 1200° C. This is not true for Examples 1 and 7 wherein no stabilizing material is used, and where further heating results in a severe reduction in surface area of the alumina film.

TABLE 1

| Example | Additive | Mole Percent By Weight | Surface Area m²/gm After Calcination for 4 Hours in Air At: 870° C. | 980° C. | 1090° C. |
|---|---|---|---|---|---|
| 7 | None | 0 | 37 | 36 | 14 to 16 |
| 8 | BaO | 4% | 62 | 46 | 26 |
| 9 | CaO | 4% | 42 | 39 | 19 |
| 10 | K$_2$O | 4% | 59 | 38 | 21 |
| 11 | La$_2$O$_3$ | 2% | 54 | 36 | 24 |
| 12 | Li$_2$O$_3$ | 4% | 40 | 41 | 20 |
| 13 | MgO | 4% | 46 | 42 | 19 |
| 14 | ThO$_2$ | 4% | 55 | 41 | 21 |
| 15 | ZrO$_2$ | 3% | 58 | 35 | 16 |

EXAMPLE 16

Table 2 summarizes the results of Examples 16 through 21. In Examples 16 through 21, a stainless steel cylinder, which is about 15.2 centimeters long and 7.62 centimeters wide, is packed with a knitted metal wire mesh having a composition of about 72 weight percent nickel, 16 weight percent chromium and 10 weight percent iron, and which is sold under the trade mark Inconel. A sodium aluminnate solution is prepared by dissolving 293 grams of sodium hydroxide in 5 liters of water contained in a battery jar and adding thereto 192 grams of aluminum in the form of pellets or granules. The packed cylinders are immersed in the sodium aluminate solution and the solution is maintained at a temperature of about 82° C. for several hours. After an alumina coating of about 120 grams is formed on the knitted metal mesh and cylinders, the packed cylinders are removed from the solution, washed in tap water and then in distilled water. The coated packed cylinders are then slowly dried, in order to avoid cracking, first at about 150° C. for about one hour, then at about 260° C. for one hour, and finally at about 540° C. for about two hours.

1.25 grams of platinum in the form of chloroplatinic acid (H$_2$PtCl$_6$), which is made slightly basic by neutralization with 3 N ammonium hydroxide (NH$_4$OH), is made up into an aqueous solution of about 75 cubic centimeters. The solution, which is slightly more than is necessary to totally wet the alumina coating, is added to a packed cylinder by orienting the cylinder in a vertical position and pouring a small quantity of the solution into one end of the cylinder while rotating the cylinder. The cylinder is then inverted and more solution is poured into the other end of the cylinder while again rotating the cylinder. These steps are repeated until all of the solution is poured into the cylinder. The cylinder is then dried and calcined at about 540° C.

After calcining, the stainless steel cylinder is opened and the coated knitted wire mesh is removed. Samples are taken from the coated knitted wire mesh at three different locations. The first sample is a combination of the two cylindrical end sections of the coated, knitted wire mesh each of which are 1.3 centimeters in length and 7.6 centimeters in diameter. Sample two is a 10 centimeters long, hollow cylindrical section which has a 0.63 centimeter thick wall and has a 6.35 centimeters inside diameter. The hollow cylindrical section is taken from the central portion of the knitted wire mesh, about 1.8 centimeters from either end of the cylinder. Sample three is the 10 centimeters long, 2.54 centimeters diameter, cylindrical central core of the coated knitted wire mesh. The core is taken about 2.6 centimeters from either end of the cylinder. The weight percent of platinum metal in the alumina coating of each sample is measured and tabulated in Table 2.

From the results shown for Example 16, it can be seen that the manner of addition described in Example 16 concentrates most of the platinum on the alumina film in the two thin cylindrical sections at either end of the knitted wire mesh.

EXAMPLE 17

A packed cylinder is coated and calcined at about 540° C. as in Example 16. A platinum containing solution is made as in Example 16, except that the quantity of solvent is about doubled to produce a total volume of solution of about 150 cubic centimeters, instead of 75 cubic centimeters as in Example 16. However, the weight of the platinum remains the same, about 1.25 grams. One half of the solution is added, as in Example 16, to the packed coated knitted mesh and then the cylinder is dried until all the solvent is removed. The other 75 cubic centimers of solutions is then added, again as in Example 16. The packed cylinder is again dried, and then calcined at about 540° C. The weight percentage of platinum found in the alumina film at the three sampling sites is tabulated in Table 2. It can be seen from Table 2 that the method and the solution used in Example 17 is more successful than that used in Example 16 in locating platinum in the central core of the coated knitted wire mesh. However, the distribution of the platinum throughout the coated knitted mesh is still uneven with most of the platinum still found in the alumina film on the cylindrical sections at either end of the cylindrically shaped knitted wire mesh.

EXAMPLE 18

A packed cylinder is coated and calcined at about 540° C. as in Example 16. A 75 cubic centimeters aqueous solution of chloroplatinic acid is made up so as to contain 1.25 grams of platinum and about 1.5 percent by weight of citric acid. The solution is added to the coated packed cylinder as in Example 16. The results of the three samples taken are set forth in Table 2 where it can be seen that the use of citric acid together with the chloroplatinic acid is not very successful in evenly distributing the metallic platinum throughout the coated knitted wire mesh. Most of the platinum is found in the alumina film on the cylindrical section at either end of the cylindrically shaped knitted wire mesh.

EXAMPLE 19

A packed cylinder is coated and calcined at about 540° as in Example 16. A 150 cubic centimeters solution, containing about 1.25 grams of platinum in the form of a platinous chloride—ammonium complex is formed by dissolving tetramine platinous chloride in sufficient water to produce the 150 cubic centimeters of solution. The platinum containing solution is added as in Example 17, with one half of the solution added, the packed cylinder dried, and then the second half of the solution added. After the addition of all of the solution, the cylinder is calcined at about 540° C. Three samples are taken, as set forth in Example 16, and the results tabulated in Table 2. Table 2 discloses that the method and solution of Example 19 succeeds in bringing some platinum metal into the central core of the cylinder, however, most of the platinum is still found in the alumina at either end of the coated knitted wire mesh.

EXAMPLE 20

A packed cylinder is coated and calcined at about 540° C. as in Example 16. A 1 percent by weight citric acid solution is made up and the packed cylinder is soaked in the solution for about one hour. The cylinder is removed from the solution and dried at 100° C. over night. A 75 cubic centimeters solution containing about 1.25 grams of platinum as the chloroplatonic acid and containing about one percent by weight lanthanum nitrate (La(NO$_3$)$_3$) is added to the cylinder as in Example 16. The cylinder is dried and calcined at about 540° C. and samples are taken as in Example 16. From the tabulation on Table 2 of the samples it can be seen that the solution and the method of Example 20 succeeds in carrying more platinum metal into the central region of the packed cylinder, and deposits less platinum in the alunima film located at the ends of the cylindrical knitted wire mesh, than in Example 16. It is believed that a higher concentration of lanthanum in the solution would have produced an even more even distribution of platinum throughout the alumina film.

EXAMPLE 21

A packed cylinder is coated and calcined at about 540° C. as Example 16. An aqueous solution of about 75 cubic centimeters containing about 1.25 grams of platinum as the chloroplatinic acid and containing about 13 weight percent of barium acetate is made. The solution is added to the coated packed cylinders as in Example 16. From the tabulation of the three samples set forth in Table 2 it can be seen that the addition of the barium compound in the platinum containing solution produces a much more uniform distribution of platinum throughout the alumina film than any other method set forth in Examples 16 through 20. An even distribution of platinum throughout the alumina film prevents the formation of hot spots caused by areas of high catalyst concentration whose high temperatures can damage the alumina and catalytic metal. Further, an even distribution of catalytic metal results in a more efficient use of the platinum metal, since more of the platinum is exposed to the gas stream resulting in a higher rate of reaction and a higher total utilization of the platinum metal.

TABLE 2

| Example | Added Solution | WEIGHT PER PLATINUM IN ALUMINA COATING | | |
|---|---|---|---|---|
| | | 1.3 cm Cylindrical Ends | Hollow Cylindrical Section | 2.5 cm Diameter Central Core |
| 16 | 1.25 gm platinum as ammonium complex in 3 M NH$_4$OH, added in 1 portion | 1.2 | 0.25 | 0.06 |
| 17 | 1.25 gm platinum as PERCENT complex in 3 M NH$_4$OH, added in 2 portions | 0.98 | 0.26 | 0.22 |
| 18 | 1.25 gm platinum as chloroplatinic acid in 1.5% citric acid solution | 1.1 | 0.13 | 0.11 |
| 19 | 1.25 gm platinous chloride ammonium complex in 3 M NH$_4$OH, added in 2 portions | 1.38 | 0.53 | 0.40 |
| 20 | 1.25 gm platinum as chloroplatinic acid in 1% La(NO$_3$)$_3$ solution | 0.83 | 0.13 | 0.24 |
| 21 | 1.25 gm platinum as chloroplatinic acid in 13 wt % barium acetate solution | 0.65 | 0.46 | 0.49 |

The above examples are merely illustrative and not meant to limit the invention which is set forth in the following claims.

What is claimed is:

1. A method of preparing a catalytic article comprising the steps of contacting a substrate and aluminum metal with an aqueous solution of an alkali hydroxide, and an alkali aluminate for a period of time sufficient to form an adherent film of alumina on said substrate; separating said substrate with said adherent film of alumina from said solution; then heating said substrate and said film of alumina under calcining conditions until said alumina film develops a desired porosity and surface area; and then contacting said calcined alumina film with a material which ameliorates the reduction in surface area and loss of structural integrity of said calcined alumina film during subsequent heating.

2. The method of claim 1 and further comprising the step of heating said substrate and said film of alumina having said material under second calcining conditions which comprise a temperature higher than that used in the first calcining conditions.

3. The method of claim 1 and further comprising the step of heating said substrate and said film of alumina having said material under second calcining conditions which comprise a temperature up to about 1260° C.

4. The method of claim 1 and further comprising the step of heating said substrate and said film of alumina having said material under second calcining conditions which comprise a temperature between about 800° C. and 1260° C.

5. The method of claim 2 wherein said substrate and said alumina film having said material are heated in air.

6. The method of claim 5 wherein said material is converted to the oxide form during the heating of said substrate and said alumina film having said material.

7. The method of claim 1 wherein said calcining conditions comprise a temperature between about 300° and 800° C.

8. The method of claim 1 wherein the step of contacting said material with said alumina film comprises contacting said alumina film with a solution comprising said material and a solvent.

9. The method of claim 1 wherein said material is selected from the group consisting of boron, alkali and alkaline earth metals, silicon, the rare earth metals, thorium, hafnium, and zirconium.

10. The method of claim 9 wherein said material comprises a barium compound.

11. The method of claim 1 wherein said alkali aluminate comprises sodium aluminate.

12. The method of claim 1 and further comprising the step of contacting said alumina film with a catalytic material.

13. A catalytic article comprising a substrate; and an adherent film of alumina formed on said substrate by contacting said substrate with an aqueous solution of an alkali hydroxide, and an alkali aluminate which solution is also in contact with aluminum metal for a period of time sufficient to form said adherent film of alumina on said substrate, then separating said substrate with said adherent film of alumina from said solution, and then heating said substrate and said adherent film of alumina under calcining conditions, and then contacting said calcined alumina film with a material which ameliorates the reduction in surface area and loss of structural integrity of said calcined alumina during subsequent heating.

14. The article of claim 13 wherein the steps of forming said adherent film of alumina on said substrate further comprise the step of heating said substrate and said adherent alumina film having said material under second calcining conditions which comprise a temperature higher than that used in the first calcining conditions.

15. The article of claim 13 wherein said alumina film has a thickness of from about $2 \times 10^{-3}$ centimeter to about $5 \times 10^{-1}$ centimeter.

16. The article of claim 13 wherein said alumina film further comprises a catalytic material in intimate contact with said alumina film.

17. A method of substantially uniformly distributing a catalytic material on an alumina film comprising the steps of contacting a substrate and aluminum metal with an aqueous solution of an alkali hydroxide, and an alkaki aluminate for a period of time sufficient to form an adherent film of alumina on said substrate; then separating said substrate with said adherent film of alumina from said solution; then heating said substrate and said film of alumina under calcining conditions; and then contacting said calcined alumina film with a solution comprising a material which ameliorates the reduction in surface area and loss of structural integrity of said calcined alumina film during subsequent heating, and a catalytic material.

18. The method of claim 17 and further comprising the step of heating said substrate, said alumina film having said ameliorating material, and said catalytic material under second calcining conditions which comprise a temperature higher than that used in the first calcining conditions.

19. The method of claim 17 wherein said ameliorating material comprises a barium compound.

20. The method of claim 17 wherein said catalytic material comprises one or more materials selected from the group consisting of metals and their compounds in groups IB, IIB, IVB, VB, VIB, and VIIB, and VIII of the Periodic Table of the Elements.

21. The method of claim 17 wherein said catalytic material is selected from the group consisting of the soluble forms of platinum, palladium, iridium, and rhodium.

22. A catalytic article formed by the process of claim 17.

* * * * *